United States Patent [19]
Cotreau

[11] Patent Number: 5,515,417
[45] Date of Patent: May 7, 1996

[54] GROUND KEY DETECTOR FOR A SLIC

[75] Inventor: Gerald M. Cotreau, Melbourne, Fla.

[73] Assignee: Harris Corporation, Melbourne, Fla.

[21] Appl. No.: 267,436

[22] Filed: Jun. 29, 1994

[51] Int. Cl.$^6$ .............................. H04M 3/08; H04M 3/22; H04M 9/00; H04M 9/08
[52] U.S. Cl. .................. 379/32; 379/34; 379/1; 379/412; 379/413
[58] Field of Search .................................. 379/1, 26, 27, 379/30, 32, 33, 34, 377, 399, 400, 402, 403, 412, 413, 404

[56] References Cited

U.S. PATENT DOCUMENTS

| | | | |
|---|---|---|---|
| 4,300,023 | 11/1981 | Kelly et al. | |
| 4,320,260 | 3/1982 | Lechner | 379/402 |
| 4,396,805 | 8/1983 | Wagner | 379/402 |
| 4,897,871 | 1/1990 | Minch et al. | 379/377 |
| 4,991,195 | 2/1991 | Hilligoss et al. | 379/1 |
| 5,113,426 | 5/1992 | Kinoshita et al. | 379/326 X |

OTHER PUBLICATIONS

Meza et al., "A two-chip subscriber line Interface circuit with ringing" IEE, Abstract, 1983.

Primary Examiner—Stephen Chin
Assistant Examiner—Paul Loomis
Attorney, Agent, or Firm—Rogers & Killeen

[57] ABSTRACT

A ground key detector for a subscriber line interface circuit (SLIC) uses information from the tip and ring voltage sensing resistor RS1 and RS2 to determine whether the ring side of the telephone line has been grounded, as when a ground key or fault occurs. The voltage difference between a tip voltage and ground is converted to a DC tip current, and the voltage difference between a ring voltage and a battery voltage is converted to a DC ring current, and the DC ring current is compared to a combination of the DC tip current and a reference current to determine whether the ring side of the telephone system has been grounded. The DC tip and ring currents may also be used to determine whether a fault exists in the tip side of the telephone line, and in the hybrid circuitry of the SLIC.

35 Claims, 4 Drawing Sheets

GROUND KEY DETECTOR FOR A SLIC

BACKGROUND OF THE INVENTION

The present invention relates to a subscriber line interface circuit for a telephone system, and more particularly to a subscriber line interface circuit and method of detecting a ground key and/or a fault in which the ground key or fault is indicated by comparing tip and ring DC currents to a reference current.

A telephone subscriber line interface circuit (SLIC) connects a balanced two wire transmission path (the path to and from the subscriber telephone handset) with an unbalanced four wire transmission path (the path to and from the telephone central station). SLICs perform various functions, including battery feed, overvoltage protection, ringing, signaling, hybrid, and timing. SLIC operation is known and need not be considered in detail. By way of brief explanatory example, and with reference to FIG. 1, a current mode SLIC 10 (a SLIC that processes the currents related to the signals in the transmission paths, rather than the voltages) uses current information available in the tip and ring voltage sensing resistors RS1 and RS2 at the two wire side of the SLIC. The current information is provided to a hybrid circuit 12 that detects incoming signals and sends them in the right direction. The hybrid circuit 12, in combination with external circuitry 14, provides appropriate amplification, far end echo cancellation, and impedance matching.

Some telephone systems ground the ring side of the telephone line to signal the operator, this signal being denominated a ground key. In such systems, additional circuitry may be provided to indicate a ground key. However, such additional circuitry adds complexity and provides further opportunities for connections to fail. Accordingly, it is desirable to reduce the amount of additional circuitry provided for ground key detection.

A SLIC also desirably is able to protect itself from faults, such as accidental grounding by linemen, cut or downed power lines, etc. If the SLIC does not detect the fault, it will attempt to drive the short and may overheat.

Accordingly, it is an object of the present invention to provide a novel ground key detector for a SLIC and method of detecting a ground key that obviates the problems of the prior art.

It is a further object of the present invention to provide a novel ground key detector for a SLIC and method of detecting a ground key in which the ground key is indicated by comparing tip and ring currents to a reference current.

It is yet a further object of the present invention to provide a novel SLIC with an integral ground key detector.

It is another object of the present invention to provide a novel fault detector for a SLIC and method of detecting a fault in which the fault is indicated by comparing tip and ring currents to a reference current.

It is still another object of the present invention to provide a ground key and fault detect circuit for a SLIC in which the ground key and/or fault are indicated by comparing tip and ring DC currents to a reference current.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

In a current mode SLIC, information from the tip and ring voltage sensing resistor RS1 and RS2 may be used to determine whether the ring side of the telephone line has been grounded, as when a ground key or fault occurs. The additional components for making this determination use current information already available in a SLIC and may be integral with the SLIC.

The tip current, $I_{TIP}$, is proportional to the voltage at the tip side of the telephone line, and the ring current, $I_{RING}$, is proportional to the voltage at the ring side of the telephone line.

$$I_{TIP}=(Ground-V_{TIP})/RS1 \tag{1}$$

$$I_{RING}=(V_{RING}-V_{BATTERY})/RS2 \tag{2}$$

When the ring side of the telephone line is grounded, as by pushing a button on the telephone handset or by accident, a large longitudinal signal appears on the line that is seen as a DC component of the current $I_{RING}$ on the line. These longitudinal DC signals are to be distinguished from the longitudinal signals that are AC components of the signal that may be induced into the telephone line. As used herein, a "fault" includes the conditions when either the tip or ring side of the telephone line is grounded. Essentially, a grounded key is merely a "fault" of a limited time duration.

Figure 2:
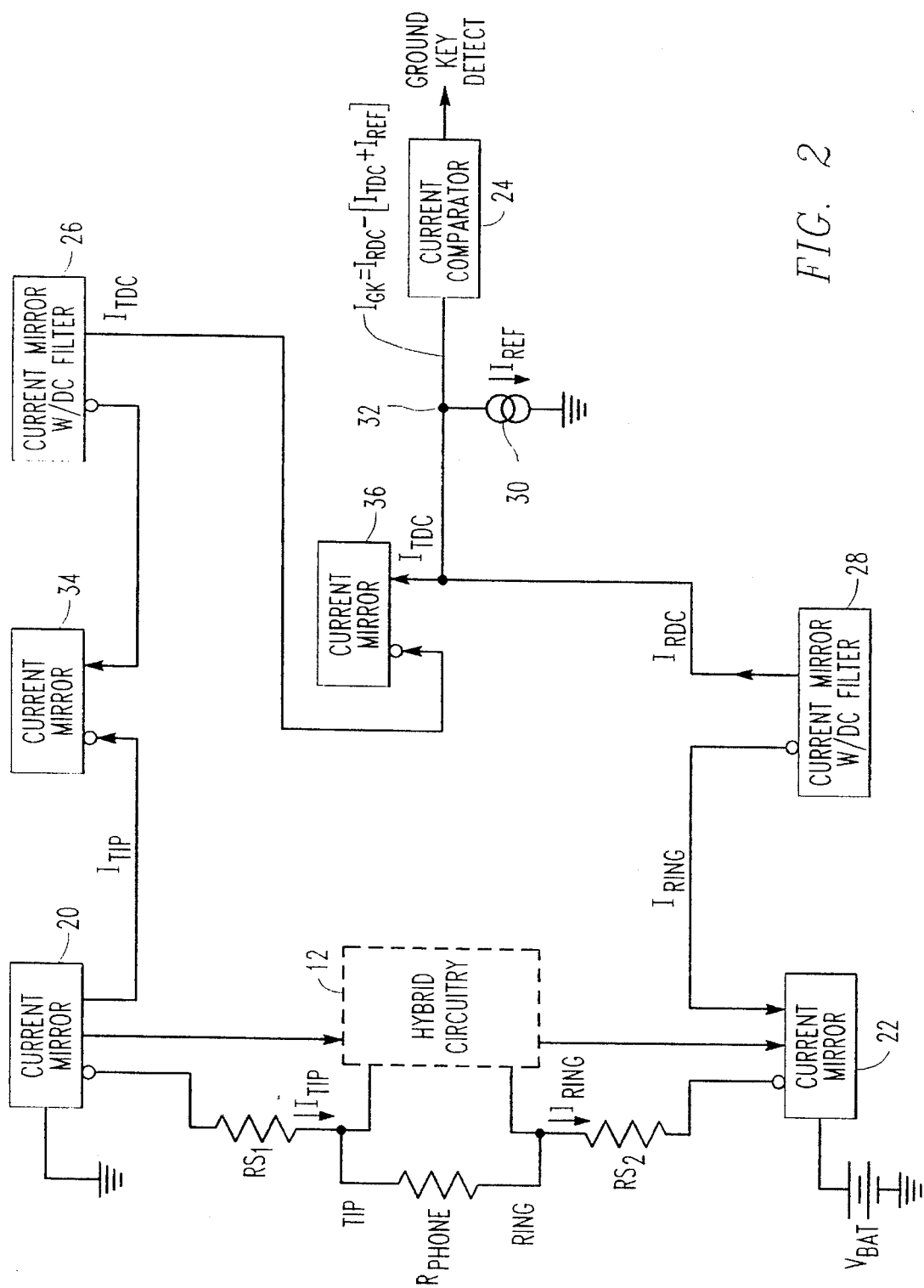
FIG. 2 is a block diagram of an embodiment of a ground key detect circuit of the present invention.

With reference now to FIG. 2, in which the hybrid circuitry 12 is shown as a box and the external circuitry 14 has been eliminated in the interest of clarity, SLIC current mirrors 20 and 22 provide copies of the tip and ring currents to the hybrid circuitry 12, and provide additional copies for use by a comparator 24 for determination whether the ring side has been grounded. The copies provided to the comparator may be processed as discussed below.

The additional copies of $I_{TIP}$ and $I_{RING}$ from current mirrors 20 and 22 may be provided to filters 26 and 28 that filter out the AC signals (including the AC longitudinal signals), leaving DC tip and ring currents, $I_{TDC}$ and $I_{RDC}$. The DC tip and ring currents may be combined with a reference current from a current source 30 and provided to the comparator 24. The current at node 32, $I_{GK}$, that will be used in the comparator 24 to determine whether a ground exists is equal is the difference between the DC ring current, $I_{RDC}$, and the combination of the DC tip current, $I_{TDC}$, and the reference current, $I_{REF}$.

$$I_{GK}=I_{RDC}-(I_{TDC}+I_{REF}) \tag{3}$$

If $I_{RDC}$ is greater than $(I_{TDC}+I_{REF})$, that is, if $I_{GK}$ is positive, the comparator 24 may provide a first output. If $I_{RDC}$ is less than $(I_{TDC}+I_{REF})$, that is, if $I_{GK}$ is negative, the comparator 24 may provide a second output (or no output). If the comparator 24 provides the first output, the DC ring current must exceed the DC tip current by at least the reference current. When the reference current is set as needed to represent anticipated DC longitudinal signal from a ground as sensed at the comparator, a positive $I_{GK}$ indicates that a DC longitudinal signal caused by a ground has appeared on the telephone line. In normal operation, the signal from the comparator 24 may be used in a conventional manner to provide a ground key indication. While a ground indication on the ring side may also indicate a fault, the response of the SLIC may be the same. That is, it may protect itself by limiting the current from the feed amps for the duration of the indication to prevent overheating.

The filters 26 and 28 may include current mirrors, and additional current mirrors 34 and 36 may be provided so that the tip, ring, and reference currents may be combined as indicated in equation (3). For example, the filters 26, 28 may include a series resistance and a shunting capacitance installed within the current mirror circuit.

Figure 3:
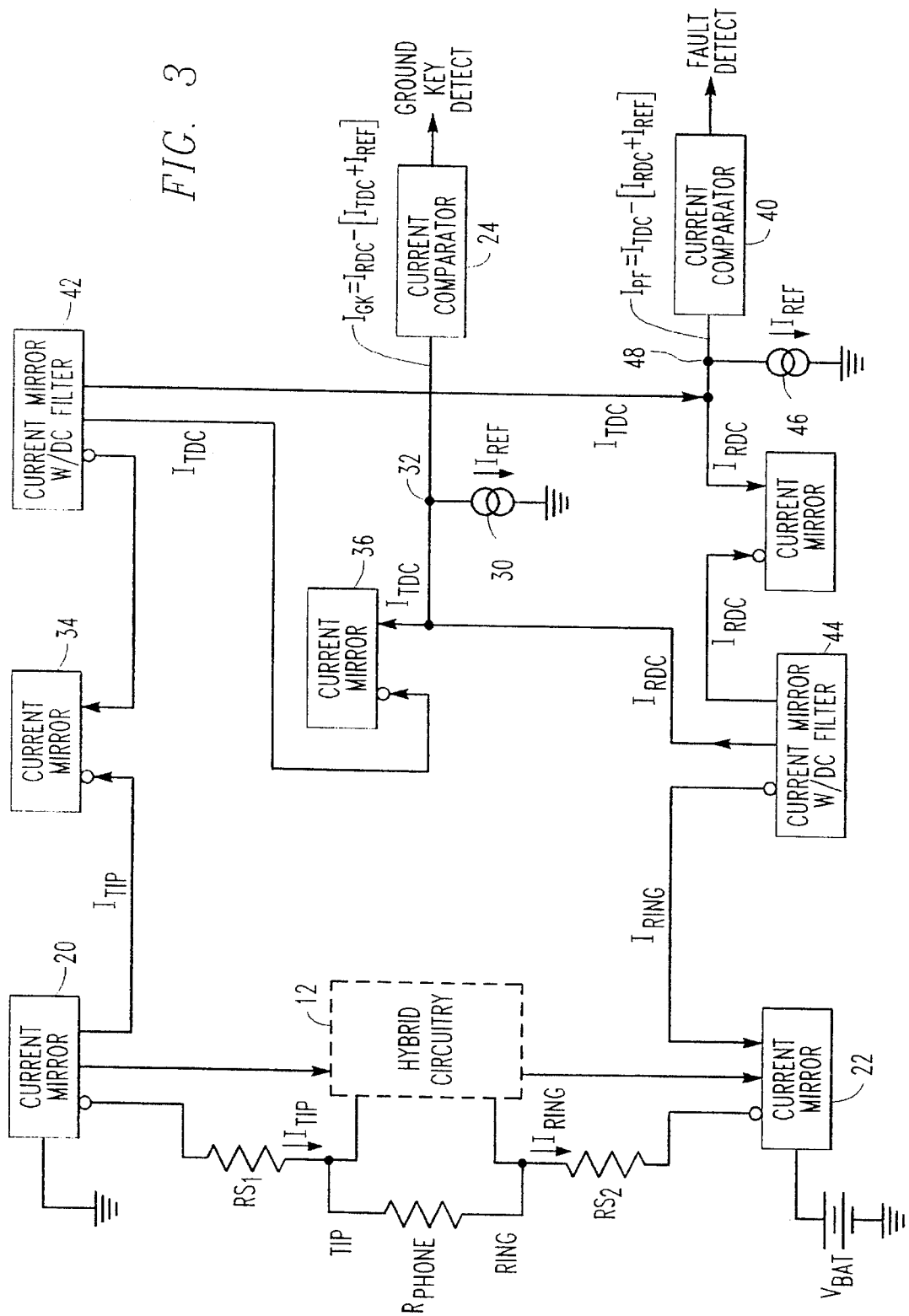
FIG. 3 is a block diagram of an embodiment of a fault detect circuit of the present invention illustrated with the ground key detect circuit of FIG. 2.

A fault may appear in the tip side of the line as well, although it would not be seen as a ground key (i.e., it is not a signal to an operator). With reference to FIG. 3, the circuit of FIG. 2 may be modified to sense a fault in the tip side by adding another comparator 40. The additional copies of $I_{TIP}$ and $I_{RING}$ from current mirrors 20 and 22 may be provided to filters 42 and 44 that filter out the AC signals (including the AC longitudinal signals), leaving DC tip and ring currents, $I_{TDC}$ and $I_{RDC}$. The DC tip and ring currents may be combined with a reference current from a current source 46 and provided to the comparator 40. The current at node 48, $I_{PF}$, that will be used in the comparator 40 to determine whether a tip side fault exists is equal is the difference between the DC tip current, $I_{TDC}$, and the combination of the DC ring current, $I_{RDC}$, and the reference current, $I_{REF}$.

$$I_{PF}=I_{TCD}-(I_{RCD}+I_{REF}) \quad (4)$$

If $I_{TDC}$ is greater than ($I_{RDC}+I_{REF}$), that is, if $I_{PF}$ is positive, the comparator 40 may provide a first output. If $I_{TDC}$ is less than ($I_{RDC}+I_{REF}$), that is, if $I_{PF}$ is negative, the comparator 40 may provide a second output (or no output). If the comparator 40 provides the first output, the DC tip current must exceed the DC ring current by at least the reference current. When the reference current is set as needed to represent anticipated DC longitudinal signal from a tip side fault as sensed at the comparator 40, a positive $I_{PF}$ indicates that a DC longitudinal signal caused by a fault has appeared on the tip side telephone line. In normal operation, the signal from the comparator 40 may be used in a conventional manner to provide a fault indication so that the SLIC may protect itself by limiting the current from the feed amps for the duration of the indication to prevent overheating.

Figure 1:
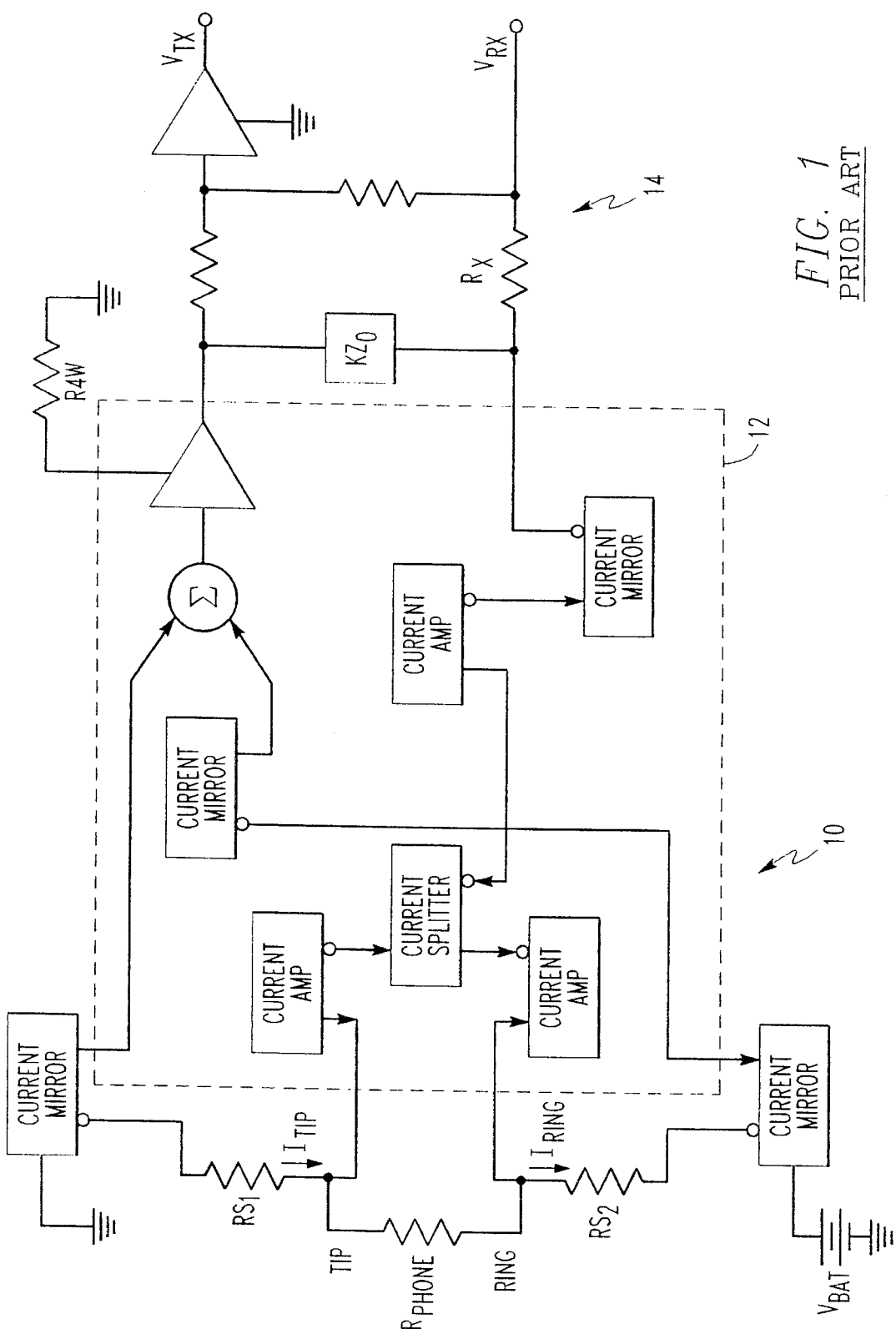
FIG. 1 is a block diagram of a current mode subscriber line interface circuit (SLIC) of the prior art.
Figure 4:
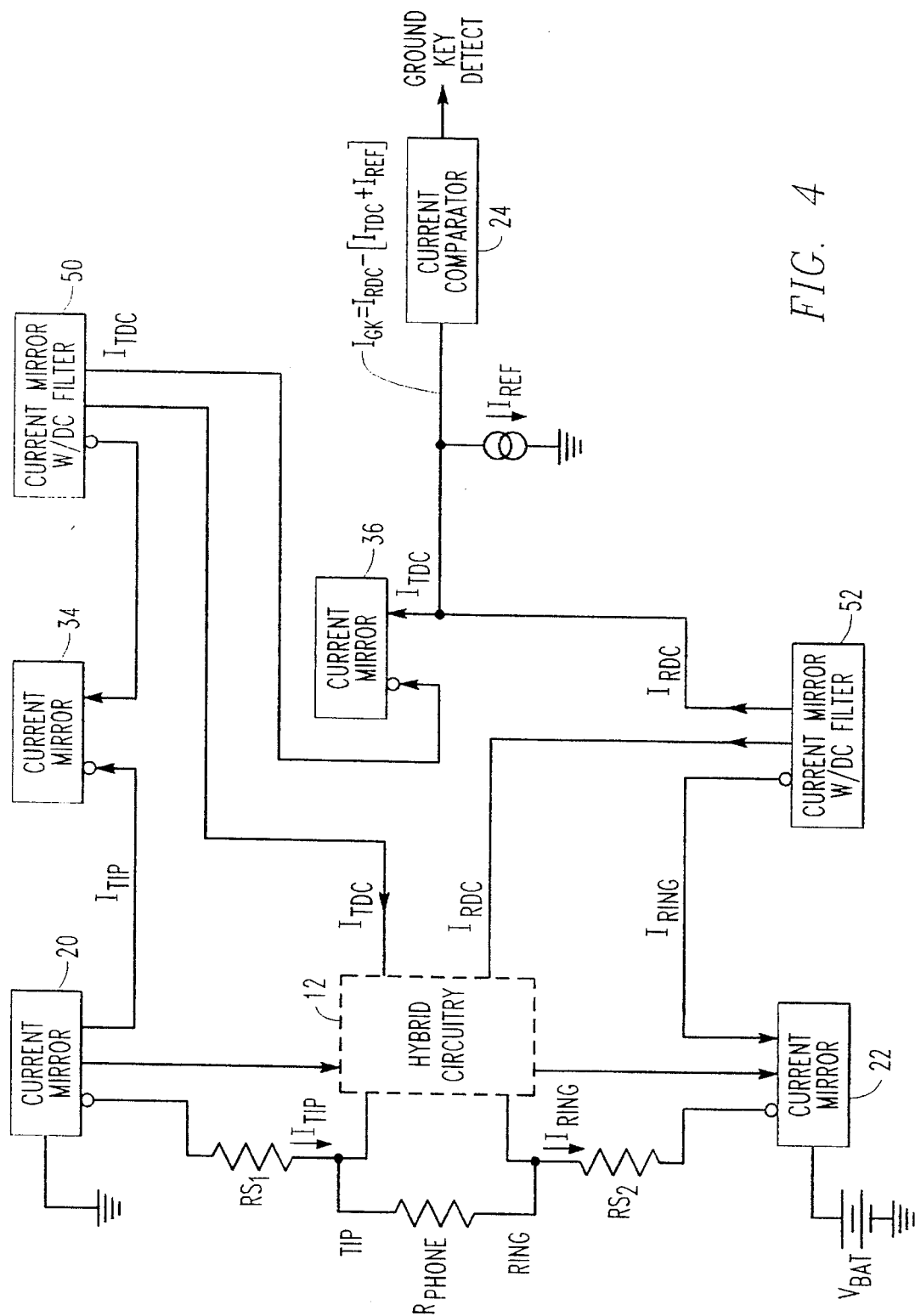
FIG. 4 is a block diagram of an embodiment of a feedback circuit of the present invention illustrated with the ground key detect circuit of FIG. 2.

The filtered DC currents from the filters 26 and 28 (or filters 42 and 44) may be used advantageously when fed back to the hybrid circuitry 12 of the SLIC. For example, a typical hybrid circuit, such as the one shown in FIG. 1, filters the sum of the tip and ring currents to feed battery power to the telephone. However, since the filters herein have already filtered the tip and ring current separately, a further copy of the tip and ring currents can be generated and provided to the hybrid circuitry. As illustrated in FIG. 4, filters 50 and 52 can provide copies of the DC tip and ring currents to the hybrid circuitry 12.

The ground key detect circuit of FIG. 2, the fault detect portion of the circuit of FIG. 3, and the feedback portion of the circuit of FIG. 4 may be provided separately, paired together as shown, or all three together (not shown).

The components illustrated in the figures are exemplary of the types of components that may be used herein, and one of skill in the art will appreciate the types preferred for particular applications. It is desirable that one or more of the ground key detect, fault detect, and feedback circuits be in an integrated circuit with an integrated circuit SLIC, or portion thereof.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A ground key detector for a subscriber line interface circuit (SLIC), the SLIC having a first current mirror for providing a current proportional to a tip voltage and a second current mirror for providing a current proportional to a ring voltage, the detector comprising:

a first DC filter for providing a DC tip current proportional to a DC component of the current from the first current mirror;

a second DC filter for providing a DC ring current proportional to a DC component of the current from the second current mirror;

a source of reference current;

a first comparator for comparing the DC ring current to a combination of the DC tip current and the reference current, and for indicating that a ground key has been detected based on the result of the comparison.

2. The detector of claim 1 wherein said first comparator indicates a ground key when the DC ring current is greater than the combination of the DC tip current and the reference current.

3. The detector of claim 1 wherein said detector is in an integrated circuit with the SLIC.

4. The detector of claim 1 further comprising means for providing a signal related to the DC tip current and the DC ring current to the SLIC for use in a hybrid portion thereof.

5. The detector of claim 1 wherein said first and second DC filters each comprise a current mirror.

6. The detector of claim 5 further comprising a third current mirror for reflecting the current from the first current mirror before it is provided to the first DC filter, and a fourth current mirror for reflecting the DC tip current from the first DC filter before it is provided to said first comparator.

7. The detector of claim 1 further comprising a fault detector comprising, a second comparator for comparing the DC tip current to a combination of the DC ring current and the reference current, and for indicating that a fault has been detected based on the result of the comparison.

8. The detector of claim 7 wherein said second comparator indicates a fault has been detected when the DC tip current is greater than the combination of the DC ring current and the reference current.

9. The detector of claim 7 further comprising a fifth current mirror for reflecting the current from said second DC filter before it is provided to said second comparator.

10. An integrated circuit SLIC comprising a portion of a ground key detector, wherein said ground key detector comprises a first DC filter for providing a DC tip current proportional to a DC component of tip voltage, and a second DC filter for providing a DC ring current proportional to a DC component of ring voltage, and wherein said ground key detector further comprises a source of reference current, and a comparator for comparing the DC ring current to a combination of the DC tip current and the reference current.

11. A ground key detector for a SLIC comprising:

a source of reference current;

means for converting a voltage difference between a tip voltage and ground to a tip current;

means for converting a voltage difference between a ring voltage and a battery voltage to a ring current; and a comparator for comparing the ring current to a combination of the tip current and the reference current.

12. The detector of claim 11 further comprising means for indicating that a ground key has been detected when the ring current is greater than the combination of the tip current and the reference current.

13. A fault detector for a SLIC comprising:

a source of reference current;

means for converting a voltage difference between a tip voltage and ground to a tip current;

means for converting a voltage difference between a ring voltage and a battery voltage to a ring current; and a comparator for comparing the tip current to a combination of the ring current and the reference current.

14. The fault detector of claim 13 further comprising means for indicating that a fault has been detected when the tip current is greater than the combination of the ring current and the reference current.

15. A current mode SLIC with a ground key detector and fault detector, said SLIC comprising:

a first current mirror for providing a current proportional to a SLIC tip voltage;

a second current mirror for providing a current proportional to a SLIC ring voltage;

a hybrid circuit for providing a battery feed for a telephone line; said ground key detector comprising:

a first combination DC filter and current mirror for providing a DC tip current proportional to a DC component of the current from the first current mirror;

a second combination DC filter and current mirror for providing a DC ring current proportional to a DC component of the current from the second current mirror;

means for providing the DC tip current and the DC ring current to the SLIC for use in said hybrid circuit;

a source of reference current;

a first comparator for comparing the DC ring current to a combination of the DC tip current and the reference current, and for indicating that a ground key has been detected when the DC ring current is greater than the combination of the DC tip current and the reference current; and said fault detector comprising:

a second comparator for comparing the DC tip current to a combination of the DC ring current and the reference current, and for indicating that a fault has been detected when the DC tip current is greater than the combination of the DC ring current and the reference current.

16. The SLIC of claim 15 wherein said SLIC, said ground key detector, and said fault detector are in an integrated circuit.

17. A method of detecting a ground key in a SLIC, the SLIC having a first current mirror providing a current proportional to a tip voltage and a second current mirror providing a current proportional to a ring voltage, the method comprising the steps of:

providing from a first DC filter a DC tip current proportional to a DC component of the current from the first current mirror;

providing from a second DC filter a DC ring current proportional to a DC component of the current from the second current mirror;

providing a reference current;

comparing the DC ring current to a combination of the DC tip current and the reference current in a first comparator; and indicating that a ground key has been detected based on the result of the comparison.

18. The method of claim 17 wherein a ground key is indicated when the DC ring current is greater than the combination of the DC tip current and the reference current.

19. The method of claim 17 further comprising the steps of providing a second comparator for detecting a fault; comparing the DC tip current to a combination of the DC ring current and the reference current in the second comparator; and indicating a fault has been detected based on the results of the comparison.

20. A method of detecting a ground key in a SLIC comprising the steps of:

converting a voltage difference between a tip voltage and ground to a tip current, and converting a voltage difference between a ring voltage and a battery voltage to a ring current; and comparing the ring current to a combination of the tip current and a reference current.

21. The method of claim 20 further comprising the step of indicating that a ground key has been detected when the ring current is greater than the combination of the tip current and the reference current.

22. A method of detecting a fault in a SLIC comprising the step of:

converting a voltage difference between a tip voltage and ground to a tip current, and converting a voltage difference between a ring voltage and a battery voltage to a ring current; and comparing the tip current to a combination of the ring current and a reference current.

23. The method of claim 22 further comprising the step of indicating that a fault has been detected when the tip current is greater than the combination of the ring current and the reference current.

24. A method of detecting a fault in a SLIC comprising the steps of:

converting a voltage difference between a tip voltage and ground to a tip current, and converting a voltage difference between a ring voltage and a battery voltage to a ring current; and comparing the ring current to a combination of the tip current and a reference current.

25. A method of detecting a fault in a SLIC comprising the steps of:

converting a voltage difference between a tip voltage and ground to a tip current, and converting a voltage difference between a ring voltage and a battery voltage to a ring current; and converting the tip current and the ring current to voltage signals related to each; and comparing the voltage signals.

26. The method of claim 25 wherein the converting of tip current and ring current comprises placing the tip current and ring current across resistors.

27. The method of claim 22 further comprising the step of indicating that a fault has been detected by comparing a signal related to the DC components of the tip current and ring current.

28. The detector of claim 11 wherein the detector is in an integrated circuit with the SLIC.

29. The detector of claim 11 further comprising means for providing a signal related to the tip current and the ring current to the SLIC for use in a hybrid portion thereof.

30. The detector of claim 11 further comprising a fault detector comprising, a second comparator for comparing the tip current to a combination of the ring current and the reference current, and for indicating that a fault has been detected based on the result of the comparison.

31. The detector of claim 30 wherein said second comparator indicates a fault has been detected when the tip current is greater than the combination of the ring current and the reference current.

32. The detector of claim 13 wherein the detector is in an integrated circuit with the SLIC.

33. The detector of claim 13 further comprising means for providing a signal related to the tip current and the ring current to the SLIC for use in a hybrid portion thereof.

34. The detector of claim 13 further comprising a ground key detector comprising, a second comparator for comparing the ring current to a combination of the tip current and the reference current, and for indicating that a ground key has been detected based on the result of the comparison.

35. The detector of claim 34 wherein said second comparator indicates a ground key has been detected when the ring current is greater than the combination of the tip current and the reference current.

\* \* \* \* \*